United States Patent
Holmstroem

(10) Patent No.: US 10,027,170 B2
(45) Date of Patent: Jul. 17, 2018

(54) WIRELESS INTERACTION WITH ACCESS CONTROL DEVICES

(71) Applicant: ASSA ABLOY AB, Stockholm (SE)

(72) Inventor: Ingemar Holmstroem, Sollentuna (SE)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 15/117,249

(22) PCT Filed: Jan. 8, 2015

(86) PCT No.: PCT/EP2015/050234
§ 371 (c)(1),
(2) Date: Aug. 8, 2016

(87) PCT Pub. No.: WO2015/121001
PCT Pub. Date: Aug. 20, 2015

(65) Prior Publication Data
US 2016/0359366 A1 Dec. 8, 2016

(30) Foreign Application Priority Data
Feb. 14, 2014 (EP) ..................................... 14155128

(51) Int. Cl.
*H02J 7/02* (2016.01)
*H02J 7/04* (2006.01)
(Continued)

(52) U.S. Cl.
CPC .......... *H02J 50/10* (2016.02); *G07C 9/00309* (2013.01); *G07C 9/00571* (2013.01);
(Continued)

(58) Field of Classification Search
CPC ...... G07C 2009/00634; G07C 9/00309; G07C 9/00571; H02J 50/10; H02J 50/80;
(Continued)

(56) References Cited

U.S. PATENT DOCUMENTS 8,536,736 B2 * 9/2013 Abramo ................. H02J 17/00
307/104
2007/0296545 A1 12/2007 Clare
(Continued)

FOREIGN PATENT DOCUMENTS

EP     2 592 601 A1   5/2013
JP     2007-308873    11/2007

OTHER PUBLICATIONS

International Search Report and Written Opinion prepared by the European Patent Office dated Jan. 30, 2015 for International Application No. PCT/EP2015/050234.
(Continued)

*Primary Examiner* — Dionne H Pendleton
(74) *Attorney, Agent, or Firm* — Sheridan Ross P.C.

(57) ABSTRACT

A user of a mobile communication apparatus (160) seeks permission to operate an access control device (110) by placing an active mobile power source unit (150), which is controlled by the mobile communication apparatus (160), within an operation range of a wireless power transmission interface (116) in the access control device (110). In response thereto, a wireless power transfer link is established between the mobile power source unit (150) and the access control device (110). Thereafter, a wireless communication link (WL2) is established between the mobile communication apparatus (160) and the access control device (110). Data are then exchanged between the access control device (110) and the mobile communication apparatus (160) over the wireless communication link (WL2). The exchanged data pertain to at least one access-related service implementable via the access control device (110); and provided that the user is authorized, the requested services are effected.

16 Claims, 2 Drawing Sheets

(51) Int. Cl.
*H02J 50/10* (2016.01)
*H04B 10/80* (2013.01)
*H02J 5/00* (2016.01)
*H02J 3/00* (2006.01)
*H02J 50/40* (2016.01)
*G07C 9/00* (2006.01)
*H02J 50/80* (2016.01)
*H02J 50/90* (2016.01)
*H04W 76/02* (2009.01)

(52) U.S. Cl.
CPC .............. *H02J 3/008* (2013.01); *H02J 5/005* (2013.01); *H02J 7/025* (2013.01); *H02J 50/40* (2016.02); *H02J 50/80* (2016.02); *H02J 50/90* (2016.02); *H04B 10/807* (2013.01); *H04B 10/808* (2013.01); *H04W 76/023* (2013.01); *G07C 2009/00634* (2013.01); *Y02T 90/122* (2013.01); *Y02T 90/128* (2013.01)

(58) Field of Classification Search
CPC .. H02J 50/90; H02J 50/12; H02J 50/20; H02J 50/30; H02J 50/40; H02J 7/025; H04W 76/023; G01R 29/0878; H04B 10/07955; H04B 10/807
See application file for complete search history.

(56) References Cited

U.S. PATENT DOCUMENTS

| | | | |
|---|---|---|---|
| 2011/0302078 A1* | 12/2011 | Failing | B60L 3/00 |
| | | | 705/39 |
| 2013/0234528 A1 | 9/2013 | Kargl et al. | |
| 2013/0335193 A1 | 12/2013 | Hanson et al. | |
| 2016/0049826 A1* | 2/2016 | Lee | H02J 7/025 |
| | | | 320/108 |
| 2017/0353059 A1* | 12/2017 | Nakano | H04B 10/07955 |

OTHER PUBLICATIONS

International Preliminary Report on Patentability prepared by the European Patent Office dated May 9, 2016 for International Application No. PCT/EP2015/050234.

Official Action for European Patent Application No. 14155128.3, dated Nov. 24, 2017, 8 pages.

* cited by examiner

WIRELESS INTERACTION WITH ACCESS CONTROL DEVICES

CROSS REFERENCE TO RELATED APPLICATIONS

This application is a national stage application under 35 U.S.C. 371 and claims the benefit of PCT Application No. PCT/EP2015/050234 having an international filing date of Jan. 8, 2015, which designated the United States, which PCT application claimed the benefit of European Patent Application No. 14155128.3 filed Feb. 14, 2014, the disclosures of each of which are incorporated herein by reference.

THE BACKGROUND OF THE INVENTION AND PRIOR ART

The present invention relates generally to automatic access control. More particularly the invention relates to an access control device according to the preamble of claim 1, a data communication system according to the preamble of claim 5 and a method according to the preamble of claim 11. The invention also relates to a computer readable medium according to claim 16.

In modern buildings, especially in business premises, electronic access control (EAC) systems are often used to control entries to and exits from various facilities. Here, the door locks are normally remote controlled from a central node based on credential data defining which subjects who are authorized to enter a certain area during a given interval of time. The credential data, in turn, may be embodied in a key fob, a smartcard, a proximity card or other appropriate carrier, e.g. a subscriber identity module (SIM) card of a mobile telephone or a personal digital assistant (PDA).

US 2007/0222542 describes a solution for transferring electromagnetic energy wirelessly to a first resonator structure from an external power supply, which includes a second resonator structure. Thus, it is rendered possible to charge for example laptops and cell-phones in a convenient manner, i.e. without the need for matching connectors between the charger and the device being charged.

Problems Associated with the Prior Art

The above-mentioned communication between the door lock and the central node as well as operating the motors in the lock mechanisms require electric energy. Therefore, either each lock is connected to a power line, or it contains a battery to provide the necessary energy. The former alternative is undesired because it may be complicated and/or costly to provide cabling to all locks. The latter alternative is also disadvantageous because sooner or later every battery must either be replaced or recharged. This, in turn, may be associated with a substantial amount of work, especially in large building complexes. Wireless power transmission, as such, is known. However, there is yet no practical solution based on this technique addressing how to supply energy to an access control device, such as a remote controlled door lock.

SUMMARY OF THE INVENTION

The object of the present invention is therefore to solve this problem, and thus offer a reliable and efficient solution for providing power to an access control device of the above-described type.

According to one aspect of the invention, the object is achieved by the initially described access control device, wherein the access control device further includes a wireless power transmission interface and a control unit. The control unit is configured to check if an active mobile power source unit is located within an operation range of the wireless power transmission interface. In other words, if a power source adapted for wireless energy transfer has been placed against (or sufficiently close to) the access control device, the control unit detects this and proceeds as follows. First, the control unit establishes, via the wireless power transmission interface, a wireless power transfer link with the mobile power source unit. Subsequently, the control unit establishes, via the second communication interface, a wireless communication link with a mobile communication apparatus, which, in turn, controls the mobile power source unit. Thereafter, the access control device exchanges data with the mobile communication apparatus over the wireless communication link. The exchanged data pertain to at least one access-related service implementable via the access control device.

This access control device is advantageous because it does not require any connection to an external power source. Naturally, this is beneficial for many reasons, for example in terms of simplicity and cost.

According to one preferred embodiment of this aspect of the invention, the access control device contains an energy storage, which is configured to: receive energy from the mobile power source unit via the wireless power transfer link and store the received energy in the energy storage. The access control device is further configured to exchange pairing data with the mobile power source unit via the wireless power transfer link, and based on said paring data connect logically with the mobile communication apparatus. Hence, the access control device can harvest energy for later use. It is also possible to temporarily link the access control device to a particular mobile communication apparatus.

According to a further preferred embodiment of this aspect of the invention, after having connected logically with the mobile communication apparatus, the access control device is configured to request, via the network node, checking in a database. This checking request aims at determining whether or not a user account being linked to the mobile communication apparatus is authorized to operate the access control device. If the user account is found to be authorized to operate the access control device, the access control device is configured to enable the mobile communication apparatus to transfer at least one control command to the access control device via the wireless communication link. Thus, a user may for example order a given lock mechanism to open.

According to another preferred embodiment of this aspect of the invention, if the user account is found to be authorized to operate the access control device, the action effected in response to the at least one control command involves using energy from the energy storage in the access control device. Consequently, a particular action may be executed without extracting any energy from the mobile power source unit that is involved in ordering this action.

According to another aspect of the invention, the object is achieved by the data communication system described initially, wherein the access control device contains a wireless power transmission interface and a second communication interface configured to exchange data wirelessly with mobile communication apparatuses. Moreover, the access control device contains a control unit configured to check if an active mobile power source unit, which is controlled by a mobile communication apparatus in the data communication system, is located within an operation range of the wireless power transmission interface. If such an active mobile power source unit is detected, the access control device is configured to establish, via the wireless power transmission interface, a wireless power transfer link between the access control device and the mobile power source unit. Thereafter, the access control device is configured to establish a wireless communication link with the mobile communication apparatus via the second communication interface. Subsequently, the access control device is configured to exchange data over the wireless communication link, which data pertain to at least one access-related service implementable via the access control device. The advantages of this data communication system are apparent from the discussion above with reference to the proposed access control device.

According to preferred embodiments of this aspect of the invention, the mobile power source unit is either mechanically connected to the mobile communication apparatus (e.g. as a snap-on module), or integrated into the mobile communication apparatus. The mobile communication apparatus and mobile power source unit thereby form a single and convenient control tool for operating the access control device.

According to another aspect of the invention, the object is achieved by the method described initially, wherein the method involves checking if an active mobile power source unit controlled by the mobile communication apparatus is located within an operation range of a wireless power transmission interface in the access control device. If it is found that such an active mobile power source unit is located within the operation range, the method further involves establishing, via the wireless power transmission interface, a wireless power transfer link between the mobile power source unit and the access control device. Thereafter, the method involves establishing a wireless communication link between the mobile communication apparatus and the access control device. Subsequently, data pertaining to at least one access-related service implementable via the access control device are exchanged over said wireless communication link. The advantages of this method, as well as the preferred embodiments thereof, are apparent from the discussion above with reference to the proposed access control device.

According to a further aspect of the invention the object is achieved by a computer program product, which is loadable into the memory of a computer, and includes software for performing the steps of the above proposed method when executed on a computer.

According to another aspect of the invention the object is achieved by a computer readable medium, having a program recorded thereon, where the program causes a computer to perform the method proposed above when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED EMBODIMENTS OF THE INVENTION

Figure 1:
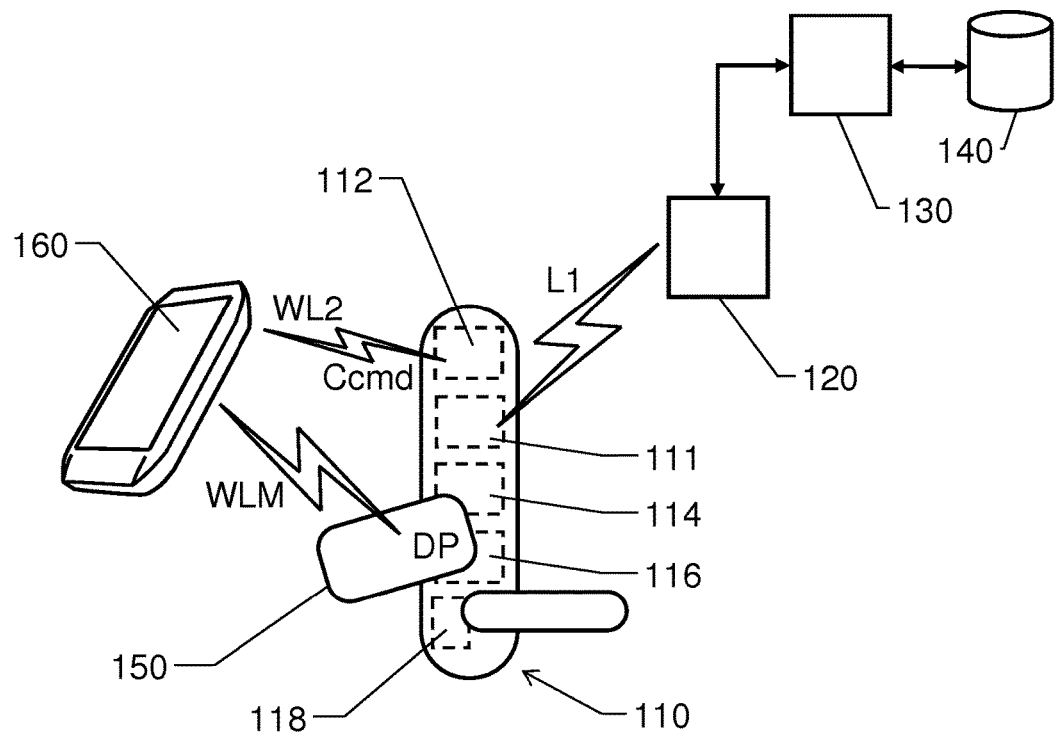
FIG. 1 shows a block diagram over a data communication system according to one embodiment of the invention.

FIG. 1 shows a block diagram over a data communication system according to one embodiment of the invention. The data communication system includes, a network node 120, a control node 130, a database 140, an access control device 110, a mobile communication apparatus 160 and a mobile power source unit 150 controlled by the mobile communication apparatus 160 via a master link WLM, which preferably is wireless and may be implemented based on the 802.15.4 (the MAC layer of Zig Bee), Bluetooth or BLE (Bluetooth Low Energy) standards. The access control device 110 is arranged to control an access related entity, such as a door lock and/or an entry/exit registering unit. The access control device 110 contains a first communication interface 111, a second communication interface 112, a wireless power transmission interface 116 (e.g. implemented via the so-called Qi standard) and a control unit 114.

The first communication interface 111 is configured to exchange data with the network node 120, either wirelessly (e.g. via a radio interface L1), or through a wire connection. The second communication interface 112 is configured to exchange data wirelessly with mobile communication apparatuses 160, e.g. via a radio interface being based on the 802.15.4 (the MAC layer of Zig Bee), Bluetooth or BLE (Bluetooth Low Energy) standards.

The control unit 114 is configured to check if an active mobile power source unit 150 is located within an operation range of the wireless power transmission interface 116. This checking may either be "automatic" in the sense that the wireless power transmission interface 116 contains a coil and transformer arrangement, which is sensitive to a magnetic field such that magnetic-field communication will be initiated as soon as any communication device that produces a matching magnetic field is placed in sufficient proximity thereto; or it may involve a specific detection step, wherein it is actively investigated in the access control device 110 whether or not an active mobile power source unit 150 is present.

In any case, if an active mobile power source unit 150 is found to be placed within said operation range, the access control device 110 is configured to establish a wireless power transfer link with the mobile power source unit 150 via the wireless power transmission interface 116.

Subsequently, the access control device 110 is configured to establish a wireless communication link WL2 with the mobile communication apparatus 160 via the second communication interface 112, and over this link WL2, exchange data with the mobile communication apparatus 160. The thus exchanged data pertain to at least one access-related service that is potentially possible to implementable via the access control device 110.

Nevertheless, before effecting any access-related services, an authorization check is performed. Preferably, this procedure involves the following steps. First, pairing data DP are exchanged with the mobile power source unit 150 via the wireless power transfer link. Based on the paring data DP, the mobile communication apparatus 160 is connected logically with the access control device 110. For example, the mobile communication apparatus 160 may be paired with the access control device 110 based on a procedure involving sending a random number from the access control device 110 to the mobile power source unit 150 using backscatter modulation. Then, said random number is forwarded to the mobile communication apparatus 160 via the master link WLM and returned over the wireless communication link WL2 to the access control device 110 for verification.

After having connected the access control device 110 logically with the mobile communication apparatus 160, the access control device 110 is preferably further configured to request checking in the database 140 to determine if a user account linked to the mobile communication apparatus 160 is authorized to operate the access control device 110.

The access control device 110 sends the request to the database 140 via the network node 120 and the control node 130. If it is found (by checking in the control node 130 or the access control device 110) that the user account is authorized to operate the access control device 110, a control unit 114 therein is configured to enable the mobile communication apparatus 160 to transfer at least one control command Ccmd to the access control device 110 via the wireless communication link WL2. Hence, for instance a control command Ccmd ordering the access control device 110 to open a door lock can be transmitted. Alternatively, for example provided that the access control device 110 is exclusively configured to handle one control command Ccmd relating to unlocking a door lock, this control command Ccmd can be generated automatically when it is found that the user account is authorized.

According to one embodiment of the invention, the mobile communication apparatus 160 is configured to request credentials for operating the access control device 110 from a so-called cloud service. After having received such credentials, a user of the mobile communication apparatus 160 can employ a mobile power source unit 150 controlled by the mobile communication apparatus 160 to power the access control device 110. Thereafter, a wireless communication link WL2 (e.g. in the form of a BLE interface) can be set up between the mobile communication apparatus 160 and the access control device 110.

According to one embodiment of the invention, the access control device 110 contains an energy storage 118 (e.g. a rechargeable battery or a capacitor), which is configured to receive energy having been received from the mobile power source unit 150 via the wireless power transfer link. If a user account has been found to be authorized to operate the access control device 110, it is further preferable if the access control device 110 is configured to, in response to the control command Ccmd, effect at least one access-control related action by using energy taken from the energy storage 118 in the access control device 110. Hence, it is not necessary to transfer energy in connection with each control command Ccmd to be executed.

It should be noted that in a stand-alone implementation of the invention, the network node 120, the control node 130 and the database 140 may all be integrated into the access control device 110. Hence, no data connection outside the access control device 110 is required in order to operate the access control device 110.

It is also worth mentioning that, if for example the first and second communication interfaces 111 and 112 are implemented by a BLE transceiver they may be represented by one and the same physical entity. Namely, a single BLE transceiver may typically realize up to five different radio interfaces.

Figure 2:
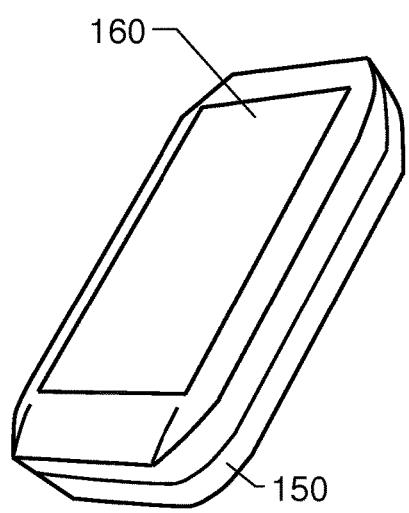
FIGS. 2-3 show two embodiments of the invention according to which the proposed mobile power source unit may be arranged.

FIG. 2 shows one embodiment of the invention according to which the mobile power source unit 150 is configured to be mechanically connected to the mobile communication apparatus 160 as a snap-on module. Thereby, a mobile communication apparatus 160, such as an existing cellphone, can be upgraded to function as a combined mobile power source unit and mobile communication apparatus according to the invention.

Figure 3:
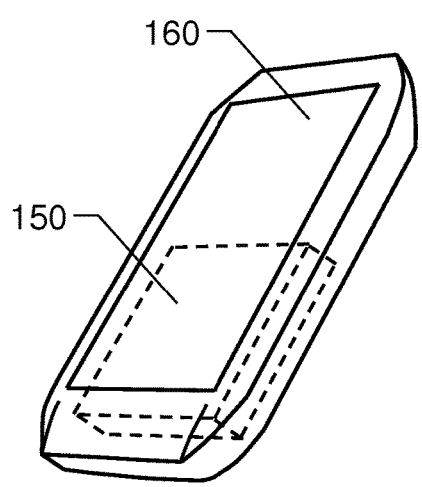

FIG. 3 shows another embodiment of the invention according to which the mobile power source unit 150 and the mobile communication apparatus 160 are co-located. Here, the mobile power source unit 150 is instead integrated into the mobile communication apparatus 160. Naturally, this vouches for a relatively compact overall design because the required coil and transformer arrangement can be an integral part of for example the structural elements in the mobile communication apparatus 160.

Both the embodiments shown in FIGS. 2 and 3 are advantageous because they require a minimal amount of entities on the user side in order to operate the access control device 110.

Preferably, the control unit 114 in the access control device 110 contains, or is communicatively connected to, a memory unit storing a computer program product, which contains software for causing the control unit 114 to perform the above-described actions when the computer program product is run on the control unit 114.

Figure 4:
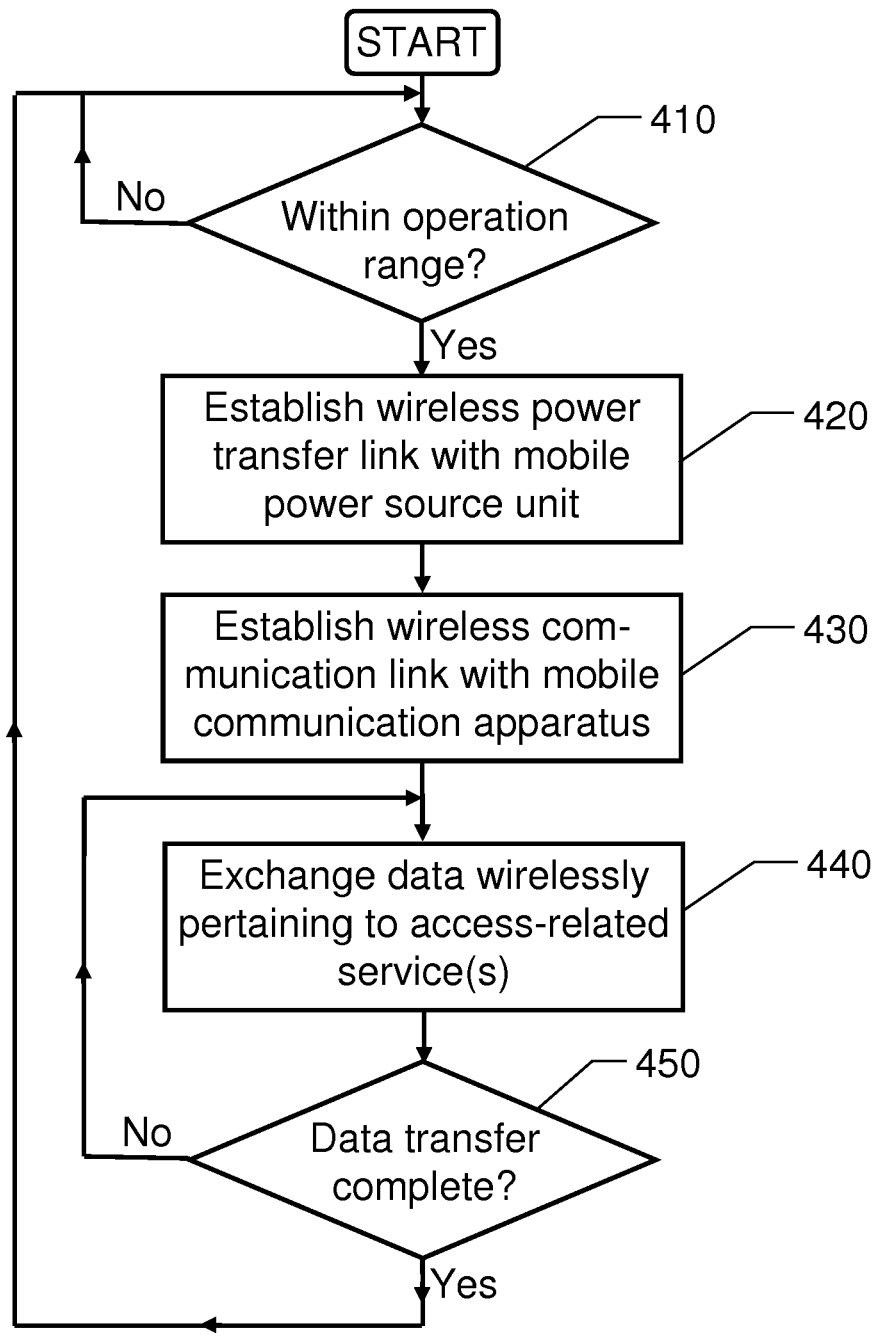
FIG. 4 illustrates, by means of a flow diagram, the general method according to the invention.

In order to sum up, with reference to the flow diagram in FIG. 4, we will now describe the general method according to the invention of interacting with an access control device 110 by means of a mobile communication apparatus 160.

A first step 410 checks if an active mobile power source unit 150 that is controlled by the mobile communication apparatus 160 is located within an operation range of a wireless power transmission interface 116 in the access control device 110. If no such mobile power source unit is encountered, the procedure loops back and stays in step 410. As mentioned above with reference to FIG. 1, the checking in step 410 may be fully automatic in the sense that the wireless power transmission interface 116 contains a coil and transformer arrangement, which is sensitive to a magnetic field such that magnetic-field communication will be initiated as soon as any communication device that produces a matching magnetic field is placed sufficiently close thereto.

If in step 410 it is found that an active mobile power source unit 150 is indeed located within the operation range of the wireless power transmission interface 116, a step 420 follows. In this step, a wireless power transfer link is established between the mobile power source unit 150 and the access control device 110. The wireless power transfer link is effected via the wireless power transmission interface 116. Preferably, establishing the wireless power transfer link is associated with a pairing procedure, e.g. involving the exchange of a random number as suggested above.

Then, in a step 430, a wireless communication link WL2 is established between the mobile communication apparatus 160 and the access control device. In a subsequent a step 440, data are exchanged over the wireless communication link WL2. The data pertain to at least one access-related service implementable via the access control device 110, for instance relating to opening a lock mechanism and/or registering a passage through a door.

All of the process steps, as well as any sub-sequence of steps, described with reference to FIG. 4 above may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An access control device, comprising:
a first communication interface that exchanges data with a network node, and
a second communication interface that exchanges data wirelessly with mobile communication apparatuses, wherein the first communication interface exchanges data with a network node to check if a user account linked with a mobile communication apparatus is authorized to operate the access control device, and the access control device further comprises:
a wireless power transmission interface, and a control unit that:
checks if an active mobile power source unit controlled by the mobile communication apparatus is located within an operation range of the wireless power transmission interface, and if so
establishes, via the wireless power transmission interface, a wireless power transfer link with the active mobile power source unit, and subsequently
establishes, via the second communication interface, a wireless communication link with the mobile communication apparatus, and subsequently
exchanges data with the mobile communication apparatus over said wireless communication link, which data pertain to at least one access-related service implementable via the access control device, and
wherein the first communication interface exchanges said data with the network node without said data passing through the mobile communication apparatus.

2. The access control device according to claim 1, further comprising an energy storage that:
receives energy from the mobile power source unit via the wireless power transfer link,
stores the received energy in the energy storage,
exchanges pairing data with the mobile power source unit via the wireless power transfer link, and based on said paring data connects logically with the mobile communication apparatus.

3. The access control device according to claim 2, wherein after having connected logically with the mobile communication apparatus, the access control device:
requests, via the network node, checking in a database to determine if a user account linked to the mobile communication apparatus is authorized to operate the access control device, and if said user account is found to be authorized to operate the access control device
enables the mobile communication apparatus to transfer at least one control command to the access control device via the wireless communication link.

4. The access control device according to claim 3, wherein, if said user account is found to be authorized to operate the access control device, the access control device, in response to said at least one control command, effects at least one access-control related action by using energy taken from the energy storage in the access control device.

5. A data communication system, comprising:
a mobile communication apparatus, and
the access control device according to claim 1,
wherein the access control device further comprises a control unit that:
checks if an active mobile power source unit controlled by the mobile communication apparatus is located within an operation range of the wireless power transmission interface, and if so
establishes, via the wireless power transmission interface, a wireless power transfer link between the access control device and the active mobile power source unit, thereafter
establishes a wireless communication link with the mobile communication apparatus via the second communication interface, and subsequently
exchanges data over said wireless communication link, which data pertain to at least one access-related service implementable via the access control device.

6. The data communication system according to claim 5, wherein the mobile power source unit is mechanically connected to the mobile communication apparatus.

7. The data communication system according to claim 5, wherein the mobile power source unit is integrated into the mobile communication apparatus.

8. The data communication system according to claim 5, wherein the access control device comprises an energy storage, and the access control device:
receives energy from the mobile power source unit via the wireless power transfer link,
stores the received energy in the energy storage, exchange pairing data with the mobile power source unit via the wireless power transfer link, and based on said paring data connects logically with the mobile communication apparatus.

9. The data communication system according to claim 8, further comprising a database and a control node, the control node being connected to the network node and the control node:
checks in the database to determine if a user account linked to the mobile communication apparatus is authorized to operate the access control device, and if said user account is found to be authorized to operate the access control device enables the mobile communication apparatus to transfer at least one control command to the access control device via the wireless communication link.

10. The data communication system to claim 9, the wherein in response to said at least one control command the access control device:

effects at least one access-control related action by using energy taken from the energy storage in the access control device.

11. A method of interacting with an access control device by means of a mobile communication apparatus the method characterized by:

checking if an active mobile power source unit controlled by the mobile communication apparatus is located within an operation range of a wireless power transmission interface in the access control device, and if such an active mobile power source unit is found to be located within said operation range establishing, via the wireless power transmission interface, a wireless power transfer link between the mobile power source unit and the active access control device, thereafter establishing a wireless communication link between the mobile communication apparatus and the access control device, and subsequently exchanging data over said wireless communication link which data pertain to at least one access-related service implementable via the access control device and exchanging data with a network node to check if a user account linked with the mobile communication apparatus is authorized to operate the access control device, said data being exchanged via a first communication interface, and said data being exchanged with the network node without said data passing through the mobile communication apparatus.

12. The method according to claim 11, wherein the method further comprises:

Transferring energy from the mobile power source unit to an energy storage in the access control device via the wireless power transfer link, exchanging pairing data between the access control device and the mobile power source unit, and based on said paring data connecting the mobile communication apparatus logically to the access control device.

13. The method according to claim 12, after having connected the mobile communication apparatus logically to the access control device, the method further comprising:

checking in a database associated with the access control device, if a user account linked to the mobile communication apparatus is authorized to operate the access control device, and if said user account is found to be authorized to operate the access control device enabling transfer of at least one control command from the mobile communication apparatus to the access control device via the wireless communication link.

14. The method according to claim 13, in response to said at least one control command, the method further comprising:

effecting, via the access control device, at least one access-control related action by using energy taken from the energy storage in the access control device.

15. The method according to claim 14, wherein the at least one access-control related action involves at least one of:

opening a lock mechanism, locking a lock mechanism and registering a passage of a subject associated with said user account.

16. A non-transitory computer readable medium, having a program recorded thereon, where the program is to make a computer execute the steps of claim 11.

* * * * *